June 21, 1927.
D. H. SWEET
1,632,807
LUBRICATING SYSTEM
Filed Jan. 29, 1926
2 Sheets-Sheet 1
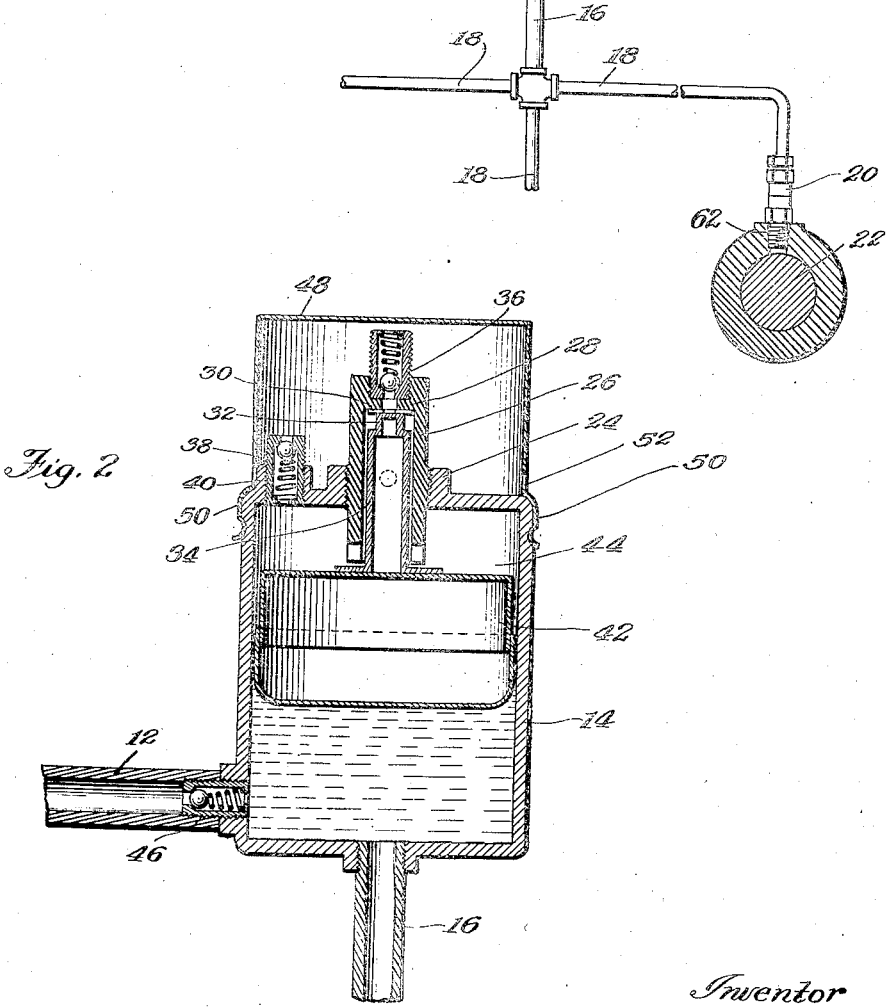
Inventor
Donald H. Sweet.
By Pierce and Sweet
Attys.

June 21, 1927.
D. H. SWEET
1,632,807
LUBRICATING SYSTEM
Filed Jan. 29, 1926
2 Sheets-Sheet 2
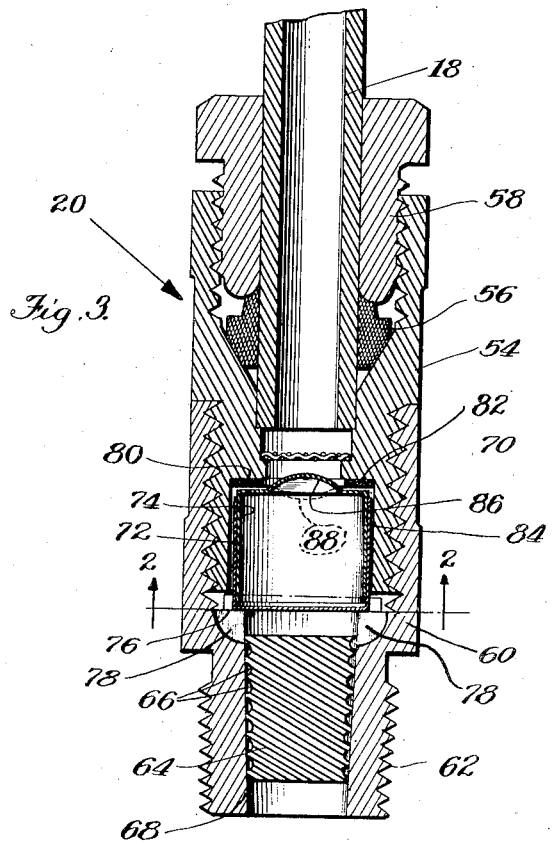
Fig. 3.
Fig. 4.
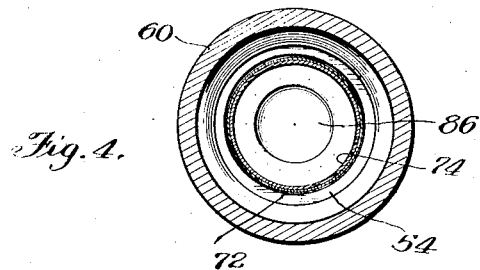
Inventor
Donald H. Sweet
By Pierce and Sweet
Attys.

Patented June 21, 1927.

1,632,807

UNITED STATES PATENT OFFICE.

DONALD H. SWEET, OF EVANSTON, ILLINOIS.

LUBRICATING SYSTEM.

Application filed January 29, 1926. Serial No. 84,726.

My invention relates to lubrication and more specifically to an improved lubricating system suitable for the automatic lubrication of the miscellaneous chassis bearings of a motor vehicle, and for similar uses.

Lubricating systems of the sort commonly referred to as "centralized" have heretofore been designed chiefly in two more or less distinct types; a first type in which a pressure impulse is delivered to the system at intervals, and the system is provided with automatic means actuated by or in accordance with the pressure impulse for measuring the amount of lubricant delivered to each bearing; and a second type in which pressure is maintained in the system more or less constantly during use of the vehicle, and the automatic apportionment of the lubricant to the different bearings occurs primarily on the basis of the resistance of different parts of the system to the flow of lubricant.

The presence of any material amount of air in a system of the first type renders it in many instances substantially inoperative, and systems of the second type are also seriously interfered with when air gets into them. Air may enter such a system in the form of small bubbles in the lubricant itself, which collect at the high points of the system, or it may be sucked in when the system is inactive, either by the lubricant flowing out under the action of gravity, or by the much stronger suction that may develop in case the system is sealed throughout and a temperature drop occurs. This cooling action may generate an almost complete vacuum inside the system at times, unless air leaks in somewhere, which, under such high suction, it is almost certain to do.

Among the objects and advantages of the present invention may be enumerated:

First, the effective elimination of all air from a lubricating system under all conditions of service.

Second, a valve of greater certainty of operation than heretofore obtainable.

Third, a valve offering no resistance to opening, but closing promptly to prevent any return flow, independent of the orientation of the structure.

Further objects and advantages of the invention will become apparent as the description proceeds.

In the accompanying drawings:

Figure 1 is a diagram of a lubricating system according to the invention.

Figure 2 is a structural section of the separation and relief chamber.

Figure 3 is a central section of a valved terminal.

Figure 4 is a section on line 4—4 of Figure 3.

In the embodiment of the invention selected for illustration, the pump 10 delivers lubricant through a connection at 12 to a separation and relief chamber 14, from which the main header 16 leads to the various branches 18, each ending in a terminal 20 associated with one of the bearings 22 to be lubricated.

The chamber 14 has an axial outlet 24 at its top, within which I mount a tube 26 constricted at 28 and provided with a seat 30 for abutment with the upper end 32 of the valve member 34, whereby a tight seal may be formed to withstand relatively high pressures. Above the constriction 28 the tube carries an outwardly opening check valve 36 constructed to open at a predetermined pressure of, say, three pound gauge. A similar check valve 38 is positioned in a boss 40 at the top of the container, being set to open inwardly and adjusted to admit air to the chamber 14 under a pressure difference of, say, three pounds per square inch, corresponding to a vacuum of three pounds within the chamber.

As each of the terminals 20 is provided with automatic check valve means preventing return flow into the system, any vacuum that may be developed in the system, as by differential thermal contraction on cooling, will be relieved by the opening of valve 38. This automatically prevents a greater suction from being developed in the system, protecting all the check valves in the terminals 20 as well as all the joints in the system from any danger of leakage.

The valve 34 is mounted on top of a suitable float 42 supported by the liquid in the chamber 14. Whenever air enters the system through the valve 38, and the liquid in the chamber is lowered, the valve 34 will move down and open the exit passage way through the tube 26 controlled only by the check valve 36. The tension of the check valve 38 should be greater than the maximum gravity head that can be developed in the system, so that it will operate only to relieve the higher suctions due to thermal effects, and prevent any drainage of the system by gravity. The capacity of the relief chamber 14 should be sufficient to absorb the maximum thermal effect to which the system will be subjected.

Whenever material has been withdrawn from chamber 14 by thermal contraction, as when the car has been parked in a cold place, and the vehicle is again put into use and lubricant is delivered under pressure through the connection at 12 it will be obvious that as soon as the pump has developed enough pressure to open the check valve 36 the air admitted through the check valve 38 will be expelled through the check valve 36, raising the level of the liquid in the chamber 14 until the valve 32 closes. After this, the pressure may continue to rise to a point limited only by the pressure producing capacity of the pump and other parts of the system.

The pump indicated may be of any suitable or preferred type. Where it operates by intermittent pressure impulses, it will be obvious that part or substantially all of the annular air space at 44 in Figure 2 can be eliminated by conforming the shape of the upper portion of the chamber to the shape of the float and the valve 34. Where the pump, when not in use, does not form a seal preventing flow of lubricant into the connection at 12 a check valve 46 should preferably be provided, set to open at immaterially higher pressure than that required to open the check valve 38. However, in case no such check valve is provided, and the contraction of the system is relieved by drawing in lubricant from the pump through the connection at 12, the system will still function as well as before if the pump is capable of expelling any air sucked into it when it is again started. Any air entering through the connection at 12 will rise in the chamber 14 and the resultant lowering of the float 42 will open the valve 32 and permit ejection of an equal amount of air to restore a proper operating condition. The same will occur with any bubbles that may be forced in through the connection 12 by a defective pump.

I have illustrated a dust cap 48 clamped in place by resilient tongues 50 and apertured by breather holes at 52.

Referring now to Figures 3 and 4, I have illustrated a valve construction of particular advantage in connection with a system embodying such a separation and relief chamber as above described. The branch tube 18 is clamped in a body 54 by suitable means such as the clamping ring 56 and the nut 58. The body 54 is in turn connected into the end piece 60 threaded at 62 for screwing the same into the bearing 22. The system illustrated apportions the lubricant on a basis of resistance. I have shown a tapered resistance plug 64 having a spiral groove 66 in its outer surface and jammed tightly into the tapered bore 68 in the end piece 60. The body 54, end piece 60 and plug 64 define a chamber 70 within which the valve is housed. The valve shown comprises an outer cup 72 and an inner cup 74 telescoped therein to form a hermetically sealed capsule of substantially the same specific gravity or density as the lubricant to be handled by the system. The valve may be held against movement in the direction of discharge by abutment with a shoulder 76 in the end piece 60, slots 78 being provided to maintain communication between the chamber and the passage 66 at all times. On the shoulder 80 at the other end of the chamber I provide a flexible packing or seat 82 to engage the edge of the valve and form a tight seal. The clearance at 84 is preferably of the order of magnitude of a few thousandths of an inch. In some systems the resistance of this annular passage may be comparable with that of the passage 66 and will assist materially in increasing the range of resistances applied to the different bearings. Any tendency to produce a return flow past this resistance will immediately move the valve back against its seat before any appreciable flow has occurred.

As a convenience in standardizing the valves, I prefer to design the inner cup with a dome at 86. The valves can then be assembled within the limits of accuracy possible in quantity production and floated through a bath having a specific gravity representing the lighter limit of the tolerance permitted in the finished valve. Any valve that is too light may then be dented in as at 88 to decrease its volume without changing its weight and bring it within the tolerance.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. The combination with a pressure lubricating system of a chamber communicating therewith, means for admitting air into said chamber at a predetermined vacuum to limit the suction in the system, means for letting air out of the system at a predetermined pressure to limit the pressure in the system, and automatic float means actuated in accordance with the amount of lubricant in said chamber, for rendering said pressure limiting means inoperative when said chamber is full.

2. The combination with a pressure lubricating system, of a chamber communicating therewith, means for admitting air into said chamber at a predetermined vacuum to limit the suction in the system, means for letting air out of the system at a predetermined pressure to limit the pressure in the system, and automatic means actuated in accordance with the amount of lubricant in said chamber, for rendering said pressure limiting means inoperative when said chamber is full.

3. The combination with a pressure lubricating system, of a chamber communicating therewith, means for letting air out of the system at a predetermined pressure to limit the pressure in the system, and automatic float means actuated in accordance with the amount of lubricant in said chamber, for rendering said pressure limiting means inoperative when said chamber is full.

4. A lubricating system comprising the combination with a plurality of bearings, of a pump, a branch system of pipes leading from said pump to said bearings, a check valve at each bearing opened by pressure in the pipes and closed by a suction in the pipes only, and means for limiting the suction in the system to a predetermined value.

In witness whereof, I hereunto subscribe my name this 26 day of January, 1926.

DONALD H. SWEET.